Nov. 13, 1934.    N. BERGLUND    1,980,178
MACHINE TOOL ATTACHMENT
Filed Sept. 29, 1932
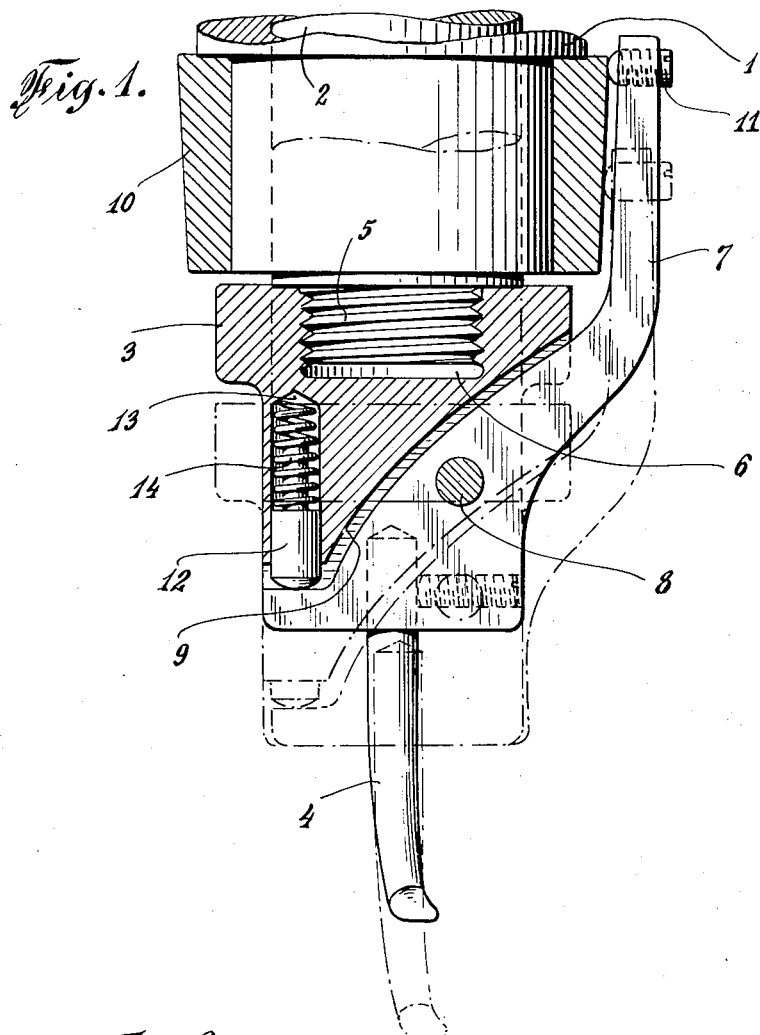
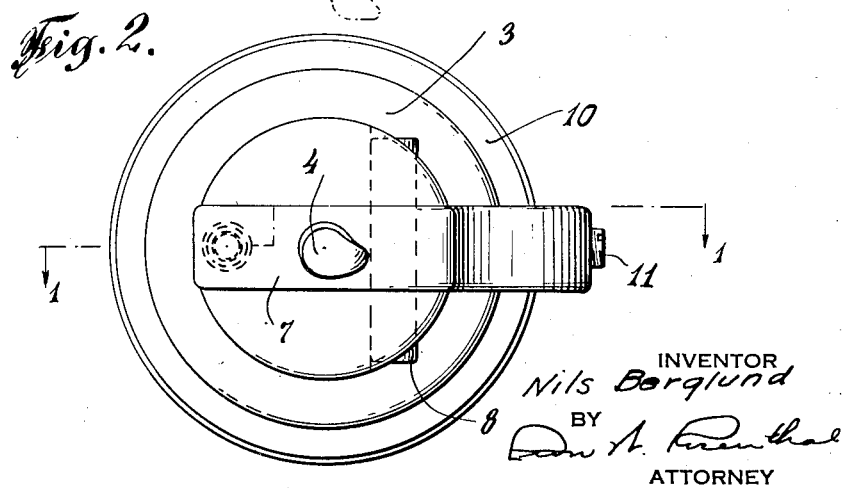
INVENTOR
Nils Berglund
BY
ATTORNEY Patented Nov. 13, 1934

1,980,178

UNITED STATES PATENT OFFICE 1,980,178

MACHINE TOOL ATTACHMENT

Nils Berglund, Springfield, Mass., assignor to United American Bosch Corporation, Springfield, Mass., a corporation of New York Application September 29, 1932, Serial No. 635,314

2 Claims. (Cl. 77—58)

This invention relates to improvements in machine tool attachments and particularly to an attachment for a boring machine adapted to cut tapered holes without necessitating any material change in the cutting tool which is operated by machine.

An object of the invention is to provide a simple attachment in the form of a chuck which can be easily mounted upon the main shaft of a boring machine and to which the cutting tool or drill is affixed, the cutting tool being supported in such a way, that as it is fed forward, it is tilted bit by bit, so that the angular inclination of the long axis of the cutting tool is inclined with respect to the direction in which the tool is moved by the machine; and thus a conical hole in a piece of stock is easily formed.

A further object of the invention is to provide an attachment for this purpose, in the form of a chuck, carrying the cutting tool in an automatically adjustable part thereof, combined with a suitable guide which so adjusts the position of said part that the desired result is easily obtained.

Other objects and advantages of the invention are fully set forth in the accompanying description, taken with the drawing, which discloses a preferred embodiment of the invention. The disclosure, however, is explanatory only and numerous changes might be made in the structure actually illustrated without departing from the principle of the invention or exceeding the scope and spirit of the appended claims.

On the drawing:

Fig. 1 is a longitudinal section through a device according to this invention; and Fig. 2 is a bottom plan of same.

The same numerals identify the same parts throughout.

In the particular description of what the drawing presents I show at 1 a bearing which is part of the framework of the machine and in which is mounted to revolve the main operating shaft 2. On the end of this shaft is screwed or otherwise attached a chuck or head 3 which carries the cutting tool or drill 4. The end of the shaft 2 is shown as having a reduced threaded end 5 which screws into a threaded cavity 6 in the chuck 3; but obviously any other way of securing the chuck 3 to the shaft 2 may be employed. The chuck 3 comprises a movable member in the form of a rocker arm or lever 7 mounted on a pivot pin 8 in a recess 9. The cutting member 4, is affixed directly to the member 7; and it will be observed that if the distance of the upper end of this member 7 from the axis of rotation of the shaft 2 is varied the angularity of the cutting tool 4 with respect to the direction of motion in which it is advanced by the machine will be correspondingly altered. It will be understood that in machines of this construction the shaft 2 is fed downward, with respect to the position of the parts shown in Fig. 1, as it revolves; and thus the cutting tool is forced through the stock that is being worked, from one face or side thereof to the other.

As the chuck or head 3 is thus displaced in an axial direction with respect to the shaft 2, the member 7 and cutting tool 4 move with it; and to control the position of the member 7, the upper end thereof makes continuous contact with a guide in the form of a sleeve 10 which encircles the lower end of the bearing 1. The outer surface of this guide sleeve is conical and the larger diameter is uppermost. A screw 11 in the upper end of the member 7 makes contact between the member and guide sleeve 10 and likewise permits manual adjustment within predetermined limits. Hence as the chuck 3 and cutting tool 4 are advanced, the guide sleeve 10 remaining stationary, the member 7 will be tilted at a varying angle according to the point of contact between the guide sleeve 10 and the screw 11. The other end of the member or rocker 7 is engaged by a plunger 12 in a recess 13 formed in the chuck and in this recess is a spring 14 which normally forces the plunger outward against the lever 7 and holds it in such position that the screw 11 is always in contact with the guide sleeve 10. A binding screw 15 holds the bit or cutting tool 4 tightly in the socket provided for it in the end of the member 7.

The operation of the device will now be made clear. As the shaft 2 advances the chuck 3 and element 4, the point of contact of the screw 11 in the lever 7 with the guide 10 changes; moving from the plane of largest diameter into planes of successively smaller diameter. Therefore the rocker tends to rotate in a counter-clockwise direction on its pivot 8 and thus move the end of the cutting tool 4 farther away from the axis thereof. Hence the tool first cuts a circular opening of relatively small diameter but this diameter is continually increased and when the tool works its way through the other side of the piece of stock, it cuts thereat an opening of considerable larger diameter; and the inner surface of the hole will be smooth and conical from one end thereof to the other. The hole thus formed will have a large taper or small taper according to the shape of the guide 10. Any number of these guide sleeves may be kept in stock to be used according to the requirements of the particular task.

The operation of the attachment is very certain because the cutting tool 4 is firmly held and the inclination of this tool is changed as it is fed forward by the combined action of the plunger 12 and the guide sleeve 10 which changes the adjustment of the parts continuously as the operation proceeds.

It will be seen that the attachment is quite simple in its outline and requires but a small number of parts that can be readily fashioned in the size and shape required for practical use, and the expense of producing this attachment is inconsiderable.

Having described the invention, what is claimed is:

1. In a removable cutting attachment for drill presses having a rotatable spindle mounted to be advanced as it rotates, a head adapted to be fixed to and rotated with said spindle, a stationary guide encircling said spindle and having a conical exterior working surface, a member pivoted intermediate its ends on said head and having an adjustable stud at one end thereof arranged to contact said conical working surface, and a cutting element secured adjacent the opposite end of said pivoted member, whereby the cutting element is caused to cut a conical surface as the spindle advances.

2. In a removable cutting attachment for drill presses having a rotatable spindle mounted to be advanced as it rotates, a head adapted to be fixed to and rotated with said spindle, a stationary guide encircling said spindle and having a conical exterior working surface, a member pivoted intermediate its ends on said head and having an adjustable stud at one end thereof arranged to contact said conical working surface, a spring urged pin mounted in said head and contacting the opposite end of said pivoted member, and a cutting element secured adjacent said opposite end of said pivoted member, whereby the cutting element is caused to cut a conical surface as the spindle advances.

NILS BERGLUND.